US007871082B2

(12) United States Patent
Zuurbier et al.

(10) Patent No.: US 7,871,082 B2
(45) Date of Patent: Jan. 18, 2011

(54) HYDRAULIC ANTI-ROLL SYSTEM

(75) Inventors: Jozef Zuurbier, Eindhoven (NL); Albertus Clemens Maria Van Der Knaap, Helmond (NL)

(73) Assignee: Nederlandse Organisatie Voor Toegepast-natuurwetenschaffelijk Onderzoek TNO, Delft (NL)

( * ) Notice: Subject to any disclaimer, the term of this patent is extended or adjusted under 35 U.S.C. 154(b) by 9 days.

(21) Appl. No.: 12/093,006

(22) PCT Filed: Nov. 9, 2006

(86) PCT No.: PCT/NL2006/000562

§ 371 (c)(1),
(2), (4) Date: Oct. 10, 2008

(87) PCT Pub. No.: WO2007/055569

PCT Pub. Date: May 18, 2007

(65) Prior Publication Data

US 2009/0115147 A1 May 7, 2009

(30) Foreign Application Priority Data

Nov. 9, 2005 (EP) .................................. 05077554

(51) Int. Cl.
*B60G 17/04* (2006.01)
(52) U.S. Cl. .............. 280/5.508; 280/5.506; 280/5.511; 280/124.106; 280/124.16
(58) Field of Classification Search ............... 280/5.511, 280/5.506, 5.507, 5.508, 5.509, 124.106, 280/124.107, 124.157, 124.16, 124.161
See application file for complete search history.

(56) References Cited

U.S. PATENT DOCUMENTS 5,097,419 A * 3/1992 Lizell .......................... 701/37

(Continued)

FOREIGN PATENT DOCUMENTS

DE  43 26 447 A1  2/1995

(Continued)

OTHER PUBLICATIONS

International Search Report dated May 2, 2007, based on PCT/NL2006/000562.

*Primary Examiner*—Paul N. Dickson
*Assistant Examiner*—George D. Spisich
(74) *Attorney, Agent, or Firm*—Leydig, Voit & Mayer, Ltd.

(57) ABSTRACT

Anti-roll system especially for a vehicle, comprising system control means, a tank (4) and a pump (3) for a hydraulic fluid, and two or more stabilizers, each stabilizer comprising an actuator (5, 6) which is arranged to control the relevant stabilizer's moment in dependency of the hydraulic pressure at the actuator's terminals. Each actuator has either one or both of its terminals (A, B) connected to a first terminal (I) of a pressure control module (8) which has a second terminal (II) connected to the tank's inlet side and a third terminal (III) to the pump's outlet side. The control means and each control module are arranged to supply a fluid pressure at its first terminal under control of said control means. The pressure control modules (8) may comprise a series connection of two pressure control valves (1, 2) e.g. pressure relief or limitation valves. As an alternative the pressure control modules (8) comprise a three-way pressure control valve (9), e.g. a three-way pressure reduction valve. To minimize energy consumption of the pump during moderate cornering and straight line driving a pressure control valve is provided in parallel to the three-way pressure control valve.

4 Claims, 3 Drawing Sheets

U.S. PATENT DOCUMENTS

| | | |
|---|---|---|
| 6,179,310 B1 | 1/2001 | Clare et al. |
| 2003/0047898 A1* | 3/2003 | Nagy et al. ........... 280/124.157 |
| 2005/0082781 A1 | 4/2005 | Germain et al. |
| 2005/0280237 A1* | 12/2005 | Stacey et al. ........... 280/124.16 |
| 2006/0038370 A1* | 2/2006 | Doerr et al. ........... 280/124.106 |
| 2008/0111325 A1* | 5/2008 | Grethel et al. ........... 280/5.508 |

FOREIGN PATENT DOCUMENTS

| | | | |
|---|---|---|---|
| DE | 43 27 044 A1 | | 2/1995 |
| DE | 4337765 | * | 5/1995 |
| EP | 0 992 376 A | | 4/2000 |
| EP | 1 175 307 B1 | | 1/2002 |
| EP | 1 426 210 A | | 6/2004 |
| EP | 1 609 636 A | | 12/2005 |
| WO | WO03/093041 | * | 11/2003 |

* cited by examiner

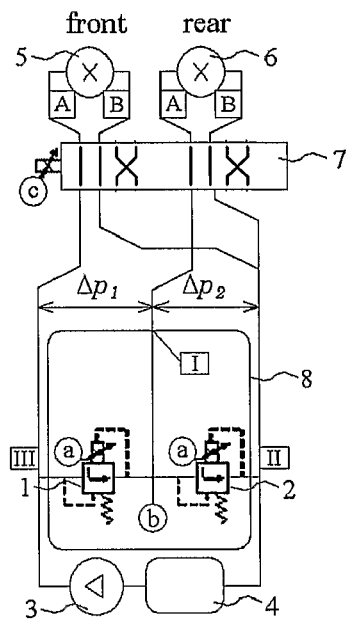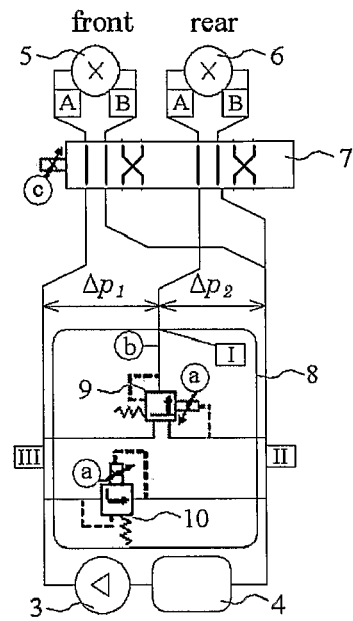
FIG. 1a  FIG. 1b
*Prior art*
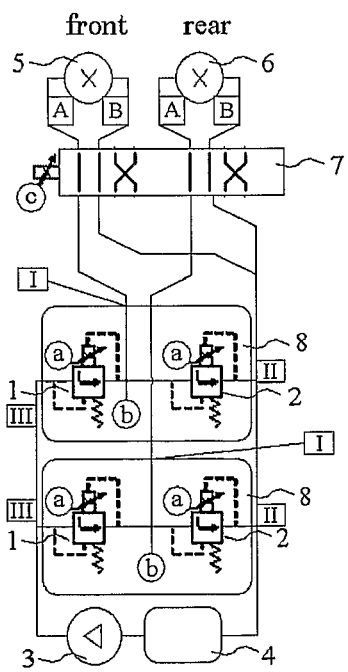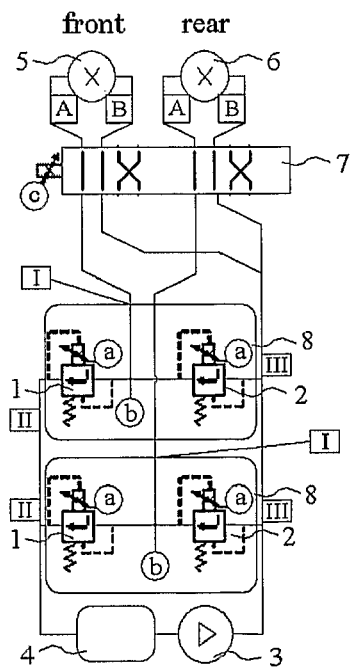
FIG. 2a  FIG. 2b

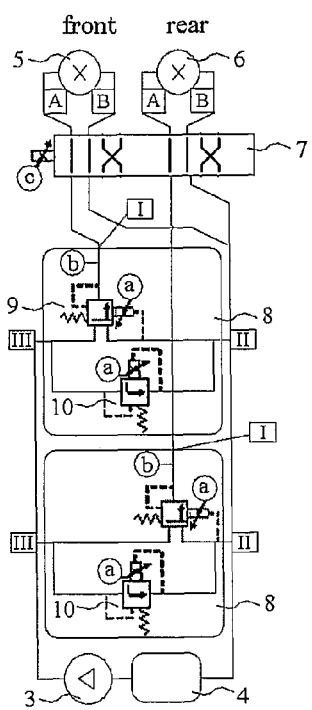
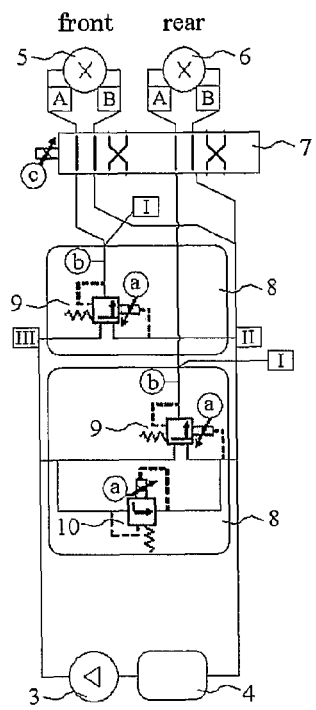
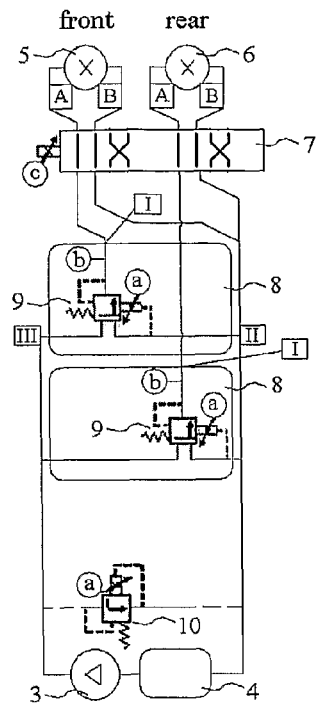
FIG. 3ᵃ            FIG. 3ᵇ            FIG. 3ᶜ

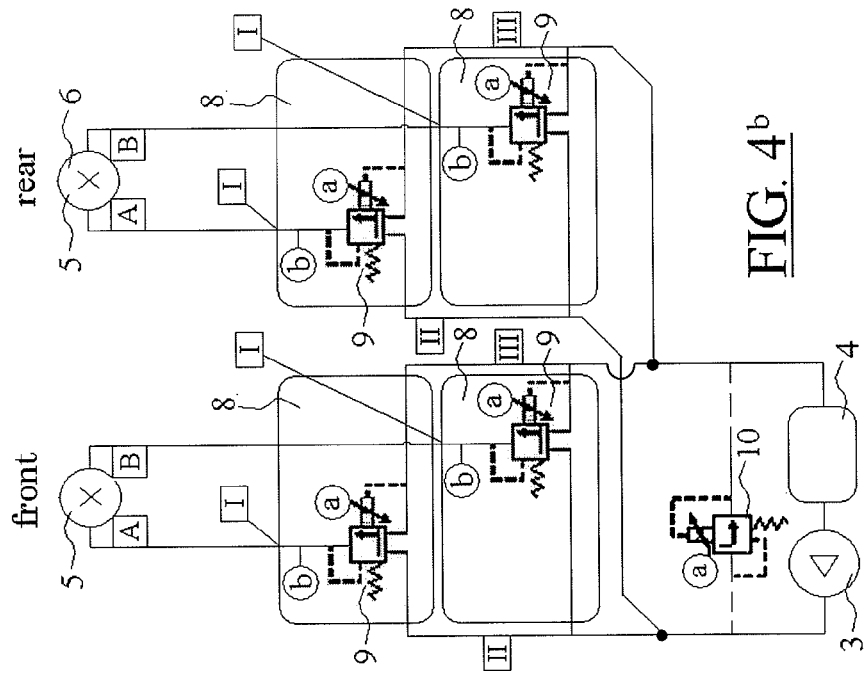
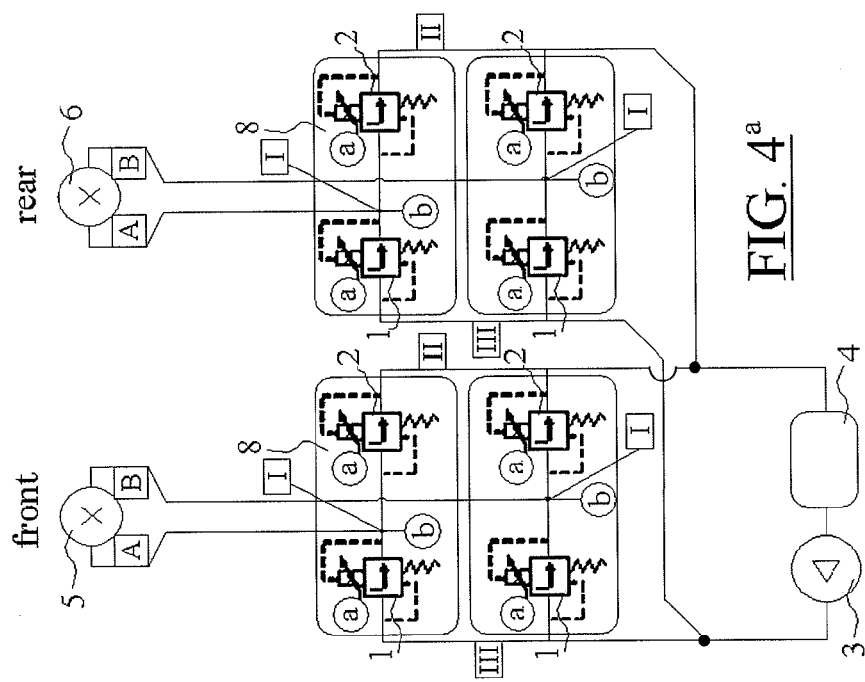
FIG. 4a
FIG. 4b

HYDRAULIC ANTI-ROLL SYSTEM

FIELD

The invention refers to a hydraulic anti-roll system for a vehicle.

BACKGROUND

The invention concerns especially a hydraulic anti-roll system which is known as BMW's "Active Roll Stabilization" (ARS) system, which e.g. has been disclosed and discussed in EP1175307 and EP0992376. In the known system a vehicle's front and rear anti-roll bars or stabilizers each are split in two halve bars, which are interconnected by a hydraulic motor or rotation actuator. Such a prior art hydraulic motor or rotation actuator may have symmetrical input/output behaviour, i.e. the ratio between the value of the hydraulic input and the value of the mechanical output is equal for each direction (sign) of the hydraulic input. Contrary to that, also configurations exist, e.g. known from US2005/0082781, which show an asymmetrical input/output behaviour, e.g. when applying a piston type actuator, comprising a piston, a piston rod and a cylinder. In that case, the ratio between the value of the hydraulic input and the value of the mechanical output will not be equal for each direction (sign) of the hydraulic input because, due to the presence of the piston rod, the effective surface area of the piston at the side of the piston rod is smaller than the piston's surface area at the other side and, in consequence, the (absolute) value of the mechanical output, given a certain (absolute) value of the hydraulic input, will behave correspondingly. The rotation actuators are controlled by an electro-hydraulic control system, commanding those actuators to adjust roll stiffness over a broad range. The ARS is an active suspension system through which the roll angle of the car can be suppressed while taking a curve.

So, a hydraulic roll stabilizer (or anti-roll bar) in fact is a roll or torsion spring whose torsion moment can be controlled by means of a hydraulic rotation actuator. The anti-roll moments of the front and the rear axle are set so that no (or reduced) roll movements of the vehicle chassis occur while taking a curve. For that purpose detectors and an e.g. computerized control system will be necessary, controlling the hydraulic pressure in actuators and thus the moments of the individual anti-roll bars. It may desirable to control the distribution of the anti-roll moments over the front and the rear axle in dependency of the vehicle speed, because this can influence the car's handling properties. At lower speeds the anti-roll moment may be set about equal, which promotes an agile (maneuverable or neutral) vehicle behaviour. At higher speeds a more stable (or understeered) driving character may be desirable. This can be realized by distribution of the anti-roll moments thus that the front axle contributes considerably more than the rear axle. According to the prior art this can be solved by realizing a hydraulic circuit comprising one pressure control module. FIGS. 1a and 1b show two simplified embodiments of the prior art circuitry, which circuitry is disclosed and discussed extensively in EP1175307 and EP0992376.

Turning to FIG. 1a now, the prior art system thus comprises a series connection of two pressure control valves 1 and 2 through which a hydraulic volume flow can be led, supplied by a pump 3, cooperating with a tank 4. A cascaded and controllable pressure $\Delta p_1$ and $\Delta p_2$ is created, controlling the pressure in rotation actuators 5 and 6. The pressure of the rear axle actuator 6 is controlled by valve 2 and amounts to $\Delta p_2$. The pressure of the front axle actuator 5 is controlled by both valves 1 and 2 and amounts to $\Delta p_1 + \Delta p_2$. The rotation actuators 5 and 6 convert these pressures into the desired anti-roll moments. A double direction valve 7 realizes that of the actuators 5 and 6 a first or a second room—via a first or a second terminal A or B respectively—is provided with a controlled pressure when the vehicle takes a curve to the left or to the right. At the front axle a so-called fail-safe valve (not shown in simplified FIG. 1) may be applied which, in case of system failure, blocks the front axle hydraulically, while the rear axle is geared independently without pressure. This results in a safe understeered driving behaviour of the vehicle. Besides, this valve realizes that the oil is circulated nearly without pressure from pump 3 to tank 4 even when the pressure control valves 1 and 2 are closed. The advantage of the prior art circuit is that all available volume flow distributes itself from the pump (during pressure building) to both actuators according to the actual need. Due to this the energy of the pump is always used optimally. To the connections 'a' and 'c' in the circuit, the vehicle's control means—e.g. a board computer or processor—may be connected, to regulate the valves 1, 2 and 5. Connection 'b' may be connected to a pressure sensor, e.g. for feed-back information to the vehicle's control means.

In FIG. 1a the pressure control valves 1 and 2 are connected in series and form together a pressure control module 8 which, in this prior art configuration controls the hydraulic pressure ($\Delta p_2$) of the rear axle actuator 6 independently while, however, the hydraulic pressure ($\Delta p_1 + \Delta p_2$) of the front axle actuator 5 is always partly dependent of the pressure ($\Delta p_2$) of the rear axle actuator 6.

The embodiment of the pressure control module 8 is illustrated in the figures which are disclosed in EP1175307 and in FIG. 2 disclosed in EP0992376. In this configuration two pressure control valves—which, relying on the used symbols, might be pressure relief or limitation valves—are connected in series and their common series connection point, their "middle terminal", is connected to one terminal of the rear axle actuator 6, the other terminal of which is connected with the tank inlet side. The remaining terminals of the series connected valves are connected with the pump's outlet side and the tank's inlet side. In this prior art configuration there is provided only one pressure control module 8, controlling the rear axle' actuator 6, while the front axle actuator 5 is directly—around the pressure control module 8—to the pump outlet and the tank inlet side.

The FIGS. 1, 3, and 4 of EP0992376 disclose an alternative embodiment in which the pressure module 8 comprises a three-way pressure control valve (15) which, relying on the valve symbol in those figures, might be a three way pressure reduction valve. The middle terminal of the three-way control valve is connected to one terminal of the rear axle actuator 6, whose other terminal is connected with the tank inlet side. In this configuration another pressure control valve (14) is provided, which, relying on the used symbol, might be a pressure relief or limitation valve, which is connected with the pump's outlet side and the tank's inlet side and may serve for protecting the system—e.g. the pump—against overpressure. FIG. 1b shows in a simplified way this alternative embodiment of the pressure control module 8, comprising a three-way pressure control valve 9—for the control of the hydraulic pressure of rear axle actuator 6 via terminal I—and a parallel pressure relief valve 10, arranged for safeguarding the pump 3 against overpressure. Moreover, the parallel pressure relief valve 10 serves for controlling the pressure of the front axle actuator 5 and to prevent that the pump does not supply a higher pressure than necessary, thus saving unnecessary energy consumption by the pump 3.

Disadvantageous of the prior art circuit is that it implies a limitation in the mutual control independency of both axes. In the prior art system the pressure of the rear axle is always less than or equal to the pressure of the front axle. This reduces the performance of vehicles controllers which may be arranged to control yaw motions (rotation movements around the vertical axle of the vehicle). For a sportive and agility increasing character of vehicle behaviour, it is often desirable to enter into a curve with oversteer. This can be reached by temporarily generating larger anti-roll moments (or larger hydraulic pressure) at the rear axle. This, however, is not possible with the current prior art (ARS) system.

SUMMARY

It is an objective of this invention to meet the prior art's shortcoming, while keeping the prior art's energetic advantage, viz. optimal use of the available pump volume flow. To that end, according to an aspect the invention provides an anti-roll system especially for a vehicle, comprising system control means, a tank and a pump for a hydraulic fluid, each of them having a fluid inlet and a fluid outlet, and two or more stabilizers, each stabilizer comprising an actuator which is arranged to control a respective stabilizer's stabilizing action in dependency of a hydraulic pressure supplied to the actuator's terminals, each actuator of said two or more stabilizers being communicatively connected to at least a first terminal of a respective pressure control module, each pressure control module comprising a second terminal and a third terminal communicatively connected in parallel relative to a pump pressure provided between the fluid inlet and fluid outlet of the pump, said control means and each pressure control module being arranged to supply a fluid pressure at its first terminal under control of said control means. In particular, an anti-roll system is provided especially for a vehicle, comprising system control means, a tank and a pump for a hydraulic fluid, each of them having a fluid inlet and a fluid outlet, and two (e.g. for passenger cars) or more (e.g. for trucks) hydraulic stabilizers, each of those stabilizers comprising an actuator which is arranged to control the stabilizer's moment in dependency of the hydraulic pressure applied to its terminals.

One or more of said pressure control modules may comprise a series connection of two pressure control valves—e.g. pressure relief or limitation valves or two-way pressure reduction valves—, said first terminal corresponding with their common series connection point ("middle terminal") and said second and third terminal corresponding with their remaining connections, to be connected with the pump (high pressure side) and tank (low pressure side).

As an alternative, one or more of said pressure control modules may comprise a three-way pressure control valve—e.g. a three-way pressure reduction valve—, said first terminal corresponding with its middle (branch) connection and the second and third terminal corresponding with their remaining connections, to be connected with the pump (high pressure side) and tank (low pressure side). If necessary—e.g. when the pump doesn't have its own (e.g. internal) overpressure protection—one or more of the pressure control modules, comprising a three-way pressure reduction valve, may comprise at least one pressure relief or limitation valve whose terminals are connected to the tank's inlet side and the pump's outlet side.

EXEMPLARY EMBODIMENTS

FIGS. 1a and 1b schematically show prior art anti-roll systems.

FIGS. 2a and 2b show two versions of a first embodiment.
FIGS. 3a, 3b and 3c show three versions of a second embodiment.
FIGS. 4a and 4b show two versions of a third embodiment.
In the below text FIG. 2 means FIG. 2a and/or FIG. 2b, FIG. 3 means FIG. 3a and/or FIG. 3b and/or FIG. 3c, and FIG. 4 means FIG. 4a and/or FIG. 4b.

All figures show an exemplary embodiment of an anti-roll system as discussed in general in the previous paragraph, comprising control means (not explicitly shown), which are connected to various system components via control terminals a and c and detection terminals b. Moreover the various embodiments comprise a tank 4 and a pump 3 for a hydraulic fluid, each of them having a fluid inlet and a fluid outlet. In the various embodiments shown in FIGS. 2 to 4 the system controls two vehicle stabilizers, viz. the vehicle's front and rear anti-roll bars which each are split in two halve bars that are interconnected by a hydraulic motor or rotation actuator. The rotation actuators, viz. the front axle actuator 5 and the rear axle actuator 6, are arranged to control the relevant stabilizer's moment in dependency of the hydraulic pressure at the actuator's terminals and are preferably symmetric, obviating a prior art need to use asymmetric actuators that use cross-sectional areas in a pressure cylinder that differ from each other depending on the actuating direction. To provide improved anti-roll behaviour of the vehicle each actuator 5 and 6 has either one (FIGS. 2 and 3) or both (FIG. 4) of its terminals A/B connected to a first terminal I of a pressure control module 8 which has, moreover, a second terminal II connected to the tank's inlet side and a third terminal III to the pump's outlet side. The control means—viz. via the terminals a and b—and each control module 8 is arranged to supply a fluid pressure at its first terminal I (connected to one terminal of actuator 5 or 6 respectively) under control of the control means. The configurations shown in the FIGS. 2 and 3 comprise a double direction valve 7, controllable by the control means via its electric control terminal c, which provides that the actuators 5 and 6 either via their first terminal A or via their second terminal B are provided with the relevant pressure when the vehicle takes a curve to the left or to the right.

In particular, according to an aspect of the invention, an anti-roll system is shown in the figures, especially for a vehicle, comprising system control means, a tank (4) and a pump (3) for a hydraulic fluid, each of them having a fluid inlet and a fluid outlet, and two or more stabilizers, each stabilizer comprising an actuator (5, 6) which is arranged to control the relevant stabilizer's moment in dependency of the hydraulic pressure at the actuator's terminals, each actuator of said two or more stabilizers having either one or both of its terminals (A, B) connected to a first terminal (I) of a pressure control module (8) which module has, moreover, a second terminal (II) connected to the tank's inlet side and a third terminal (III) to the pump's outlet side, said control means and each control module being arranged to supply a fluid pressure at its first terminal under control of said control means.

In this respect, a stabilizer's stabilizing action may in particular infer an anti-roll moment exerted on the vehicle for keeping the vehicle stable. In addition, the term being communicatively connected implies a substantial single pressure line between relevant pressure terminals (A, B, I, II, or III) and the inlets of pump. Furthermore, the term connected in parallel refers to a substantially same pressure being provided in parallel to terminals of respective pressure control modules.

In FIG. 2 the two pressure control modules 8 each comprise a series connection of two pressure control valves 1 and 2. The control module's first terminal I corresponds with the control valves' common series connection point (middle point) and the second terminal II and the third terminal III correspond with their remaining, outside connections. For the series connected pressure control valves 1 and 2 preferably electrically proportionally controllable (viz. by the control means via terminals a) pressure relief (or limitation) valves may be used. In general a pressure relief valve can fulfil two different functions. As a safety valve it will only open in case of emergency, preventing that the pressure is becoming too high. Under normal process condition it will be closed. Besides, it can be used as pressure reduction valve, viz. for setting and keeping the relevant pressure constant. Under normal process condition it is opened and provides passing through a restricted part of the pump flow. In the current embodiment of the invention both functions are performed by the series connected relief valves, viz. as a safety valves, preventing that the system pressure will become too high, and as pressure reduction valve, viz. for controlling—by means of the control means, connected to the electrical terminals a—the pressure of the hydraulic fluid supplied to the relevant actuator 5 resp. 6.

Instead of a series connection of pressure relief valves a series connection of two-way pressure reduction valves could be used. In that case the pump 3—when not already protected by e.g. an internal pressure relief valve—should be protected by a pressure relief valve connected with the pump's outlet and inlet (so in parallel with the pump 3) or with the pump's outlet side and the tank's inlet side (so in parallel to the series connection of pump 3 and tank 4).

In the embodiment shown in FIG. 2, each actuator has its own series connection to control the desired specific pressure independently from the other. With the two series connected pressure limitation valves the highest requested control pressure can be realized (this can be both the front and the rear axle). The difference between the configurations of FIGS. 2*a* and 2*b* is that in FIG. 2*a* both actuators have a common low pressure side and in FIG. 2*b* both actuators have a common high pressure side. This can lead to different behaviour during fast pressure building control actions: in FIG. 2*b*, the pressure will initially be distributed to both axes and in the configuration of FIG. 2*a* the axle with the highest pressure will win the competition because for the axle with the lowest pressure the first control valve 1 will close temporarily. The disadvantage of the configuration of FIG. 2*b* is, however, that a third pressure sensor is desirable for precise pressure control (feed back to the control means).

FIGS. 3*a*, 3*b* and 3*c* show three versions of a second embodiment, in which one or more of said pressure control modules 8 comprise a three-way pressure control valve. In this embodiment the first terminal I of the pressure control module 8—connected with one actuator terminal—corresponds with the three-way pressure control valve's middle connection and the second terminal II and third terminal III correspond with their remaining, "outside" connections. As a three-way pressure control valve a three-way pressure reduction valve may be used.

The pump 3—when not already protected by e.g. an internal pressure relief valve—should be protected against overpressure. Moreover, the pump 3 should be provided with energy saving means, viz. by limiting the pump's pressure to the requested pressure at each moment. Both, overpressure protection and energy saving can be realized by means of a pressure relief valve connected with the pump's outlet and inlet (so in parallel with the pump 3) or with the pump's outlet side and the tank's inlet side (so in parallel to the series connection of pump 3 and tank 4). Such a protecting pressure relief valve could be comprised by the pressure control module 8, or could be separate from it. FIG. 3 shows three versions. In each version one terminal of each actuator 5 or 6 is connected with the first (middle) terminal I of the three-way pressure reduction valve 9, which is further—with its outside terminals II and III—connected with the outlet side of pump 3 and the inlet side of tank 4.

In the version of FIG. 3*a* each pressure control module 8 comprises a pressure relief valve 10, connected parallel to the outside terminals of the three-way pressure reduction valve 9. So, this embodiment comprises two pressure relief valves 9 in parallel.

In the version of FIG. 3*b* only one pressure control module 8 comprises a pressure relief valve 10, connected parallel to the outside terminals of the three-way pressure reduction valve 9. So, this embodiment comprises one pressure relief valve 9 to restrict the pump's pressure to the pressure demand at each moment, resulting in restricting the pump's energy consumption.

In the version of FIG. 3*c* not any pressure control module 8 comprises any pressure relief valve but in this embodiment an external pressure relief valve 9 may protect the pump 3 or an internal (within the pump 3) one, in which case the external pressure relief valve 9 will be unnecessary (see dashed connection lines).

Pressure reduction valves have the property that they connect the actuator 5 or 6—via the middle (first) terminal I—either to the pump outlet (high pressure) side or to the tank (low pressure) side. As soon as the control pressure has been reached, a more or less blocked middle position is created in order to keep the desired pressure in the actuator. This pressure can thus be lower than that of the other axle. The advantage of the embodiment of FIG. 3 is that one control valve—having one control current coil—is needed, which is an advantage with regard to system costs and electric load of the on board electric power supply. On the contrary such three-way reduction valves are more complex.

FIGS. 4*a* and 4*b* show two versions of a third embodiment. In both versions of FIG. 4 each gate (terminal) of each rotation actuator 5, 6 is connected to the first (middle) terminal I of a pressure control module 8 (four modules 8 in total). Because in this configuration each actuator terminal A and B is provided of its own individual pressure need—in the foregoing embodiments always one actuator terminal A or B was, depending on the status of direction valve 7, connected either to the tank 4 inlet side or to the pump 3 outlet side—it is not longer necessary to work with a direction valve 7 as in the previous embodiments. Due to the redundancy per axle in this configuration the need for a fail-safe valve for the front axle (which may be needed—however not shown—in the previous embodiments) could be omitted. Due to this omission of the fail-safe valve and the direction valve improvement of the driving comfort could be expected. The rotation movements of the actuators due to road bumpiness will generate pulsing volume flows which have to be pushed through the valves and pipes. The lower resistance of this circuit will result in improved driving comfort due to less pressure pulsation. Also the stationary energy consumption at straight line driving will turn out to be lower due to restricting the pump's pressure to the requested pressure at each moment (at straight line driving the requested pressure will be minimal). Due to the four parallel channels from the pump 3 to tank 4, the minimally achievable fluid resistance will be lower, causing that the hydraulic basis pressure at the pump 3 can be lower.

For completeness it is noted that in practical embodiments of the system outlined above it may be preferred that e.g. the various control modules 8—which in the various figures have been indicated as separate items—may be incorporated within one common, integrated control module block. By doing so, e.g. the various interconnection lines and the outside volume of the whole can be minimized.

The system as outlined above provides that the pressures supplied to the actuators of both axes are independently controllable (pressure at the rear axle may be higher than at the front axle). The complete pump power or flow rate can always be used optimally, independent of the desired pressure distribution. Besides, compared to the prior art system, advantages with regard to the driving comfort at the front axle and energy consumption during straight line driving will occur.

The invention claimed is:

1. An anti-roll system especially for a vehicle, comprising: system control means, a tank and a pump for a hydraulic fluid, the tank and the pump each having a fluid inlet and a fluid outlet, and two or more stabilizers, each one of the two or more stabilizers comprising an actuator which is arranged to control a respective stabilizer's stabilizing action in dependency of a hydraulic pressure supplied to terminals of the actuators, each actuator of said two or more stabilizers being communicatively connected to at least a first terminal of a respective pressure control module, each pressure control module comprising a second terminal and a third terminal communicatively connected in parallel relative to a pump pressure provided between the fluid inlet and fluid outlet of the pump, said system control means and each pressure control module being arranged to supply a fluid pressure at its first terminal under control of said system control means, wherein one or more of said pressure control modules comprises a series connection of two pressure control valves, said first terminal corresponding with a common series connection point, and said second terminal and said third terminal corresponding with remaining connections of the series connection of two pressure control valves.

2. The anti-roll system according to claim 1, wherein said series connection of two pressure control valves comprises pressure relief or limitation valves.

3. An anti-roll system especially for a vehicle, comprising:
system control means, a tank and a pump for a hydraulic fluid, the tank and the pump each having a fluid inlet and a fluid outlet, and two or more stabilizers, each one of the two or more stabilizers comprising an actuator which is arranged to control a respective stabilizer's stabilizing action in dependency of a hydraulic pressure supplied to the terminals of the actuators, each actuator of said two or more stabilizers being communicatively connected to at least a first terminal of a respective pressure control module, each pressure control module comprising a second terminal and a third terminal communicatively connected in parallel relative to a pump pressure provided between the fluid inlet and fluid outlet of the pump, said system control means and each pressure control module being arranged to supply a fluid pressure at its first terminal under control of said system control means,
wherein each actuator has a first and a second terminal connected, respectively, to a first terminal of one of a set of first and second pressure control modules, and
wherein one or more of said pressure control modules comprises a series connection of two pressure control valves, said first terminal corresponding with a common series connection point, and said second terminal and said third terminal corresponding with remaining connections of the series connection of two pressure control valves.

4. Anti-roll system according to claim 3, wherein said series connection of two pressure control valves comprises pressure relief or limitation valves.

* * * * *

UNITED STATES PATENT AND TRADEMARK OFFICE
CERTIFICATE OF CORRECTION

| | | |
|---|---|---|
| PATENT NO. | : 7,871,082 B2 | |
| APPLICATION NO. | : 12/093006 | |
| DATED | : January 18, 2011 | |
| INVENTOR(S) | : Jozef Zuurbier and Albertus Clemens Maria Van Der Knaap | |

It is certified that error appears in the above-identified patent and that said Letters Patent is hereby corrected as shown below:

On the Title page
Item [73] Assignee:    "Nederlandse Organisatie voor toegepast-natuurwetenschaffelijk Onderzoek TNO"

should be

--Nederlandse Organisatie voor toegepast-natuurwetenschappelijk Onderzoek TNO--

Signed and Sealed this
Twenty-second Day of March, 2011

David J. Kappos
*Director of the United States Patent and Trademark Office*